United States Patent
Koerfer et al.

(10) Patent No.: US 11,180,426 B2
(45) Date of Patent: *Nov. 23, 2021

(54) DIPEPTIDE-CONTAINING GRANULAR MATERIAL

(71) Applicant: Evonik Operations GmbH, Essen (DE)

(72) Inventors: Martin Koerfer, Kahl (DE); Hans Joachim Hasselbach, Gelnhausen (DE); Gerit Niggemann, Frankfurt (DE); Antje Hansmeier, Antwerp (BE); Hans Christian Alt, Gelnhausen (DE); Dominik Egly, Michelstadt (DE); Peter Schulte, Zuelpich (DE)

(73) Assignee: Evonik Operations GmbH, Essen (DE)

( * ) Notice: Subject to any disclaimer, the term of this patent is extended or adjusted under 35 U.S.C. 154(b) by 281 days.

This patent is subject to a terminal disclaimer.

(21) Appl. No.: 16/312,638

(22) PCT Filed: Jun. 27, 2017

(86) PCT No.: PCT/EP2017/065761
§ 371 (c)(1),
(2) Date: Dec. 21, 2018

(87) PCT Pub. No.: WO2018/001988
PCT Pub. Date: Jan. 4, 2018

(65) Prior Publication Data
US 2019/0322600 A1    Oct. 24, 2019

(30) Foreign Application Priority Data
Jun. 27, 2016 (EP) ..................... 16176371

(51) Int. Cl.
*C05C 11/00* (2006.01)
*C05C 3/00* (2006.01)
(Continued)

(52) U.S. Cl.
CPC ............... *C05C 11/00* (2013.01); *B01J 2/00* (2013.01); *B01J 2/02* (2013.01); *C05C 3/00* (2013.01);
(Continued)

(58) Field of Classification Search
None
See application file for complete search history.

(56) References Cited

U.S. PATENT DOCUMENTS 10,683,240 B2 * 6/2020 Jakob ............. C05G 5/20
2003/0172698 A1 9/2003 Koda et al.
(Continued)

FOREIGN PATENT DOCUMENTS

CN      1250608 A      4/2000
CN      1336914 A      2/2002
(Continued)

OTHER PUBLICATIONS

International Search Report dated Sep. 18, 2017 in PCT/EP2017/065761 filed Jun. 27, 2017.
(Continued)

*Primary Examiner* — Wayne A Langel
(74) *Attorney, Agent, or Firm* — Oblon, McClelland, Maier & Neustadt, L.L.P.

(57) ABSTRACT

The present invention relates to a process for producing a particulate composition containing methionine, methionylmethionine, potassium in the form of potassium salt and ammonium sulphate, and use thereof.

21 Claims, 2 Drawing Sheets

Apparatus for carrying out a spray granulation

1  Dust extractor (e.g. cyclone, filter, wet scrubber)
2  Pump (e.g. positive displacement pump)
3  Nozzle air (e.g. air, nitrogen)
4  Heating (e.g. electrical, steam, gas-fired)
5  Air supply fan
6  Sieve trays, Conidur metal plate
7  Fluidized bed, moving-bed
8  Exhaust air fan (51) Int. Cl.
  *C05D 1/02* (2006.01)
  *C05G 5/12* (2020.01)
  *C05G 5/30* (2020.01)
  *B01J 2/00* (2006.01)
  *B01J 2/02* (2006.01)

(52) U.S. Cl.
  CPC ............... *C05D 1/02* (2013.01); *C05G 5/12* (2020.02); *C05G 5/30* (2020.02)

(56) References Cited

U.S. PATENT DOCUMENTS

2009/0078014 A1* 3/2009 Yamashita ............... C05D 9/02 71/11
2013/0255338 A1* 10/2013 Lopez-Cervantes .... C05F 11/08 71/7

FOREIGN PATENT DOCUMENTS

| CN | 1680311 A | 10/2005 |
| EP | 1 233 071 A2 | 8/2002 |
| EP | 1 233 071 A3 | 8/2002 |

OTHER PUBLICATIONS

Mitchell, C. C. et al. "Evaluation of a Liquid Potassium Bicarbonate/Amino Acid Co-Product as a Source of Potassium, Nitrogen, and Sulfur," Journal of Plant Nutrition, vol. 17, No. 12, 1994, pp. 2119-2134, XP008125142.
U.S. Appl. No. 16/312,638, filed Dec. 21, 2018, Koerfer, et al.
U.S. Appl. No. 08/913,970, filed Dec. 12, 2000, U.S. Pat. No. 6,159,252, Schütte, et al.
U.S. Appl. No. 08/866,161, filed Nov. 24, 1998, U.S. Pat. No. 5,840,358, Höfler, et al.
U.S. Appl. No. 09/382,782, filed Sep. 11, 2001, U.S. Pat. No. 6,287,627, Binder, et al.
U.S. Appl. No. 09/309,278, filed Oct. 3, 2000, U.S. Pat. No. 6,126,972, Körfer, et al.
U.S. Appl. No. 15/022,642, filed Aug. 11, 2016, 2016/0227816, Alt, et al.
U.S. Appl. No. 16/148,484, filed Oct. 1, 2018, Jakob, et al.

* cited by examiner

Figure 1: Apparatus for carrying out a spray granulation

| | |
|---|---|
| 1 | Dust extractor (e.g. cyclone, filter, wet scrubber) |
| 2 | Pump (e.g. positive displacement pump) |
| 3 | Nozzle air (e.g. air, nitrogen) |
| 4 | Heating (e.g. electrical, steam, gas-fired) |
| 5 | Air supply fan |
| 6 | Sieve trays, Conidur metal plate |
| 7 | Fluidized bed, moving-bed |
| 8 | Exhaust air fan |

Figure 2: Sulphur content in the gas phase via the spray granulates

TRS: total reduced sulphur

1 Product according to Example 2 (uncoated): Integral = 0.031
2 Product according to Example 1 (coated): Integral = 0.025
3 Product according to Example 6 (comparative example): Integral = 0.57
4 Moist product according to Example 2: Integral = 0.11
5 Moist product according to Example 1: Integral = 0.12

Figure 3: Storage characteristics of the spray granulate with variation over time Climate cabinet (20°C, 40% rh)

1: Product according to Example 2; 2: Product according to Example 5

DIPEPTIDE-CONTAINING GRANULAR MATERIAL

The present invention relates to a particulate composition containing methionine, methionylmethionine, potassium salt and ammonium sulphate and use thereof and a process for production thereof.

The amino acid methionine is currently industrially produced worldwide in large amounts and is of considerable commercial importance. Methionine is employed in many fields, such as pharmaceutical, health and fitness products, but particularly as feedstuff additive in many feedstuffs for various livestock. On an industrial scale, methionine is produced chemically via the Bucherer-Bergs reaction, which is a variant of the Strecker synthesis. Here, the starting substances 3-methylmercaptopropanal (prepared from 2-propenal and methylmercaptan), hydrocyanic acid (hydrogen cyanide), ammonia and carbon dioxide are reacted to give 5-(2-methylmercaptoethyl) hydantoin (methionine hydantoin) and this is subsequently hydrolysed by alkali with potassium carbonate and potassium hydrogen carbonate to give potassium methioninate. Methionine is finally liberated from its potassium salt by treatment with carbon dioxide, which may be filtered off as a precipitate from the mother liquor containing potassium carbonate and potassium hydrogen carbonate (U.S. Pat. No. 5,770,769). The ammonia, potassium carbonate and potassium hydrogen carbonate reagents and also carbon dioxide are generally recycled in industrial methionine production. However, it is necessary from time to time to partially exchange the aqueous mother liquor of this hydantoin hydrolysis circulation for fresh potassium hydroxide, essentially to remove ("purge") inactivated potassium salt from the circulation in the form of neutral potassium formate. Potassium formate forms from the residues of hydrogen cyanide and potassium salts from the hydantoin hydrolysis present in the methionine hydantoin solution (WO2013030068A2). A further by-product of methionine synthesis is the dipeptide methionylmethionine (EP 1 564 208 A1). In general, the excessive enrichment of by-products in the hydantoin hydrolysis circulation must be avoided since otherwise disruptions in crystal formation occur downstream.

The so-called purge solution comprises approximately 2 to 6% by weight methionine, 4 to 8% by weight methionylmethionine and 6 to 14% by weight potassium in the form of potassium salts. Due to the potassium, nitrogen and sulphur content, this solution is suitable as a liquid fertilizer (C. C. Mitchel and A. E. Hiltbold, Journal of Plant Nutrition, 17(12), 2119-2134, 1994). It would be desirable, however, to provide such a fertilizer in solid form. However, attempts to dewater this solution to give a solid, free-flowing solid mixture in order to render this material of value capable of storage and transport have hitherto been unsuccessful (cf. example 6 in this document).

The object of the present invention is accordingly to provide a solid fertilizer based on methionine and potassium salts and also a simple and cost-effective process for the production thereof, in which in particular the aqueous mother liquor of the hydantoin hydrolysis circulation described above is also usable as a material of value.

It has now been found, surprisingly, that the purge solution mentioned above can be readily processed by controlled addition of ammonium sulphate to give a free-flowing, storage-stable solid composition.

The stated object is achieved by a process for producing a particulate composition containing methionine, methionylmethionine, potassium salt and ammonium sulphate, wherein the process comprises the following steps:

(a) providing an aqueous mixture, the starting mixture, containing 0.5 to 4% by weight, preferably 1 to 3% by weight methionine, 0.5 to 5% by weight, preferably 1 to 4% by weight methionylmethionine, 1 to 9% by weight, preferably 2 to 7% by weight of potassium in the form of potassium salt and 7 to 35% by weight, preferably 10 to 30% by weight ammonium sulphate, (b) generating solid particles from the aqueous mixture provided in step (a) by a forming process with upstream and/or simultaneous evaporation of the water, and (c) drying the particles obtained in step (b).

The process can be carried out simply and cost-effectively in standard apparatuses.

Such an aqueous starting mixture as in step a) can be produced in accordance with the invention by mixing an aqueous solution (i) containing 30 to 40% by weight ammonium sulphate with an aqueous solution (ii) containing 2 to 6% by weight, preferably 3 to 5% by weight methionine, 4 to 8% by weight, preferably 5 to 7% by weight methionylmethionine and 6 to 14% by weight, preferably 8 to 12% by weight potassium in the form of potassium salt in a ratio of the aqueous solution (ii) to the aqueous solution (i) of from 1.0/0.5 to 1.0/3.0.

Advantageously, it is possible to use here directly as aqueous solution (ii) mentioned above, by separating a mother liquor formed in the reaction of 5-(2-methylmercaptoethyl) hydantoin with potassium carbonate, potassium hydrogen carbonate and carbon dioxide (hydantoin hydrolysis circulation in industrial methionine production) to give methionine, which is thus supplied in an environmentally friendly manner as a useful recovery.

Advantageously, the aqueous solution containing ammonium sulphate (i) may originate directly from the production of hydrogen cyanide from methane and ammonia required for the industrial production of methionine, for example by the Andrussow process (U.S. Pat. No. 8,802,020 B2) or the BMA process (F. Endter, Chemie-Ing.-Techn. 30, 1958, No. 5, 305-310), and is formed primarily by treating a gaseous mixture comprising hydrogen cyanide and ammonia, generated in this case, with sulphuric acid (sulphuric acid scrub) and subsequent neutralization of the resulting aqueous solution with ammonia. This solution is thereby supplied simultaneously in an environmentally friendly manner as a useful recovery.

In this manner, two additional streams of materials of value obtained from industrial methionine production are transferred to a novel advantageous product without the necessity of further additives.

The potassium salt can take the form of either one salt or two or more salts of inorganic or of organic acids, for example at least one potassium salt selected from the group comprising formic acid, acetic acid, propanoic acid, 2-hydroxypropanoic acid, 2-hydroxy-4-methylthiobutanoic acid and also methionine and methionylmethionine at appropriate pH, potassium hydrogen carbonate, potassium carbonate, potassium hydrogen sulphate and potassium sulphate.

The aqueous of starting mixture in step (a) is preferably treated with sulphuric acid, before further treatment thereof in step (b), in an advantageous manner until a pH of 3 to 6, particularly preferably 3.5 to 5.5 is achieved in the aqueous mixture (measured at room temperature with a glass pH electrode filled with liquid electrolyte (3 molar KCl solution)).

During the preparation of the starting solution from solutions (i) and (ii) for example, some ammonium carbonate is formed from ammonium sulphate and potassium carbonate, which decomposes on heating to ammonia and carbon dioxide and escapes in the form of these gases. By adding sulphuric acid, the release of ammonia is largely prevented and this is again bound in the form of ammonium sulphate, wherein essentially only carbon dioxide escapes. Adjusting the pH to 3 to 6 further acts to improve the storage stability of the particles obtained in step (c) of the process according to the invention, which is also apparent from the results presented in Table 3 and FIG. 3.

In an advantageous configuration of the process according to the invention, the aqueous mixture provided in step (a) is concentrated prior to step (b) by evaporation of water to give an aqueous suspension with a solids content of up to 70% by weight. By means of the concentration, energy costs in step (b) of the process according to the invention are saved. The resulting suspension may be subjected to another homogenization prior to step (b), for example by means of a jet mixer and a high-performance dispersing machine.

The solid particles are generated from the aqueous starting mixture with simultaneous evaporation of water in accordance with step (b), advantageously using the forming processes of extrusion, mix granulation, compaction or spray granulation. The process according to the invention can be carried out either as batchwise or continuous processes, for example in an extruder, fluidized bed or moving-bed granulator or mixing granulator.

A preferred method for carrying out step (b) of the process according to the present invention is spray granulation. In this case, air and nitrogen are particularly suitable as gas component which, for example, together with the aqueous starting mixture as a liquid component, is introduced via a two-phase nozzle. The spray granulation is preferably carried out in this case in a fluidized bed, optionally by the bottom spray or top spray process. Such a process enables the formation of particularly uniform particles of the particulate composition according to the invention with a relatively narrow particle size distribution. The particle size to be achieved in the discharge is in this case dependent on the nucleus balance in the fluidized bed system. This is determined essentially by the equilibrium of nucleation by abrasion or non-impinging spraying droplets, and the construction of granules. The particle size can be adjusted in a controlled manner by selecting the drying and spraying parameters and also by the use of a chopper. The granules thus generated can be discharged continuously from the drying chamber in the desired particle size by a classifying unit (e.g. sifter, underflow weir). The particle size of the product can be adjusted more narrowly by means of a downstream sieve. The oversized particles from the sieving is comminuted by a mill and is recycled together with the fine particles separated by cyclone (e.g. pneumatically or by conveying screw). This has the purpose that sufficient nuclei for the granulation are present in the process chamber and no product is lost.

The spray granulation is carried out at a temperature in the fluidized bed of 60 to 130° C., preferably 80 to 110° C. The pressure has little influence on the process. The process is typically operated at a slightly reduced pressure of 5 to 50 mbar, preferably of ca. 10 mbar, in order to avoid the discharge of dust from the system.

The spray granulation is also preferably carried out via one or more nozzles with 1.0 to 8.0 mm nozzle diameter, at nozzle pressures of 1.0 to 5.0 bar, ideally 2.0 to 3.0 bar. The spray rates of the mixture used should be chosen as a function of the system size.

A two-phase nozzle (pneumatic atomizer) is particularly suitable as nozzle type, preferably with circular full cone as atomizing configuration (e.g. from Schlick). When using the two-phase nozzle, the gas component together with the aqueous starting mixture from step a) as liquid component is sprayed through the nozzle.

An ammonium sulphate shell layer may also be applied to the particles obtained in step (b) of the process according to the invention by spraying with an aqueous solution containing 30 to 40% by weight ammonium sulphate with simultaneous evaporation of water, wherein the proportion of the ammonium sulphate shell layer thus formed on the particles is 5 to 30% by weight based on the total solids content of the particles. The particular advantage in this case is that the shell layer additionally encloses unpleasant odour components and in this manner an almost odour-neutral product is generated. The aqueous ammonium sulphate solution to be used for the spraying may be identical to the aforementioned solution (i), i.e. it may also originate from hydrogen cyanide production for example.

On a smaller scale, the batchwise mode is preferred, i.e. the coating takes place after the granulation process. On an industrial production scale, the continuous mode is preferred. The granulator is preferably subdivided in this case into several zones. The first zones are used for the granulation step (b). Then a coating zone, a drying zone and a cooling zone follow for the appropriate processing of the granules primarily formed. The drying and cooling may also be carried out in separate systems (e.g. fluidized bed dryer/cooler with integrated heating and cooling elements). Suitable granulators are typically fluidized bed or moving-bed systems.

The present invention further relates to a particulate composition comprising as constituents 1.5 to 10% by weight, preferably 2 to 8% by weight methionine, 2.5 to 9% by weight, preferably 3 to 7% by weight methionylmethionine, 4 to 20% by weight, preferably 5 to 17% by weight potassium in the form of potassium salt and 27 to 80% by weight, preferably 30 to 76% by weight ammonium sulphate. The entirety of the proportions by weight of all constituents, including the optionally present proportions of other minor components inclusive of residual moisture of typically up to ca. 1% by weight, add up here to 100% by weight. This particulate composition may be prepared using the processes according to the invention described above.

The particulate composition according to the invention is suitable for use as fertilizer or fertilizer additive, particularly as nitrogen/potassium/sulphur (NPS) fertilizer for application to areas under cultivation of useful plants. Compared to the purge solution used to date as liquid fertilizer, said composition has a distinctly higher active ingredient concentration and also better storage properties and product stability. The product is also non-hazardous from a safety perspective. For example, it is not a combustible dust product. The necessity for liquid transport and storage in appropriate tanks or tanker vehicles is also dispensed with. The product may also be delivered to customers in smaller containers, e.g. sacks or big bags.

The particulate composition according to the invention has an average particle size of ca. 1 to 4 mm. This has the advantage, particularly compared to larger particles, that it can be relatively uniformly distributed on the areas under cultivation and therefore overdosage or underdosage can be avoided.

Another feature of the fertilizer composition according to the invention compared to some known organic/mineral fertilizer compositions is that it is preferably essentially free of urea and particularly preferably is completely free of urea. The organic nitrogen fraction is provided in this case primarily by the proportion of methionine and methionylmethionine. Therefore, firstly urea-related material costs are saved and secondly additional organic sulphur is provided. Essentially urea-free particulate composition is understood to mean here a particulate composition having <1% by weight urea.

It is also very favourable that, in addition to methionine, Met-Met also contributes to the organic (N+S) content, since the organic (N+S) content is thereby higher by ca. 6.4% in comparison to the Met weight equivalents [factor=2*molar weight (Met)/molar weight (Met-Met)].

The potassium salt can take the form of either one salt or two or more salts of inorganic or of organic acids, for example the potassium salts selected from the group comprising formic acid, acetic acid, propanoic acid, 2-hydroxypropanoic acid, 2-hydroxy-4-methylthiobutanoic acid and also methionine and methionylmethionine at appropriate pH, potassium hydrogen carbonate, potassium carbonate, potassium hydrogen sulphate and potassium sulphate. These potassium salts have the advantage that the acid residues also make a contribution to the fertilizing effect. The composition can be advantageously admixed with further potassium salts, phosphates for example, which can bring additional uses in an application as fertilizer since in this manner a nitrogen/phosphorus/potassium/sulphur (NPPS) fertilizer is obtained.

In a further advantageous embodiment, the particles of the composition according to the invention have been coated with an ammonium sulphate layer, which optionally additionally comprises $NH_4HSO_4$, wherein the proportion of the ammonium sulphate layer formed on the particles is 5 to 30% by weight, preferably 10 to 25% by weight and particularly preferably 10 to 20% by weight, based on the total solids content of the particles.

The optional ammonium sulphate layer contributes significantly to substantially avoiding the unpleasant odours typically occurring in sulphur-containing fertilizers. In addition, hygroscopic properties of the particles present to some extent are significantly reduced thereby. An additional advantage is that the shell layer itself consists of an active fertilizer component and therefore contributes at the same time to the active ingredient content of the particles usable as fertilizer.

Since the ammonium sulphate content of the composition according to the invention already prevents clumping of the particles, the admixing of a binder or flow aid is generally superfluous. Nevertheless, if a binder or flow aid is intended to be used for the production of the fertilizer compositions according to the invention, this is introduced advantageously, in the case of the batchwise mode of operation of a fluidized bed granulator, by mixing the binder or flow aid with the starting material in the fluidized bed. The residue of the evaporated solution (ii) or the mother liquor of the hydantoin hydrolysis circulation described above is particularly suitable as starting material (carrier material), which, for example, has previously been comminuted with a screen mill to a suitable average particle size of, for example, d50=150 µm. As an alternative, methionine powder (e.g. having a particle size d50=180 µm) or Ekoperl—an oil binder composed of porous volcanic silicate rock (Perlite) e.g. in the grain size 0.125 to 2 mm—are used as starting material.

Suitable as binder are, for example, porous volcanic silicate rock (e.g. Perlite), precipitated or fumed silica or porous carbonate rock.

In the case of the continuous mode of operation, e.g. a production process, the binder or flow aid is advantageously added by means of injector, suction cycle conveying, pneumatic conveying, rotary valves, stirred reservoir vessel or conveying screw.

BRIEF DESCRIPTION OF THE DRAWINGS

For the purpose of better illustrating the advantages and properties of the claimed invention, several graphs are attached as non-limiting examples, wherein:

EXAMPLES

Suitable Apparatus and General Description of the Performance of the Process

The spray granulations were carried out with the aid of a fluidized bed system. The principle set-up of a fluidized bed system is shown schematically in FIG. 1. The process chamber (vortex chamber) consists of a conical vessel with sieve trays (diameter here=150 mm, mesh size=100 µm). In the middle of the sieve tray is a two-phase nozzle (nozzle diameter here=1.2 mm) with two inlet nozzles. The solid/liquid mixture is metered in via one nozzle by means of a pump (e.g. peristaltic pump). Compressed air is supplied via the second nozzle in order to finely distribute the liquid in the process chamber and to spray onto the fluidized bed present therein (fluidized solid). At the same time, hot air (or nitrogen) is allowed to flow from bottom to top in the apparatus in order firstly to fluidize the material present and secondly to evaporate the sprayed liquid. The solid sprayed ideally remains adhered to the particles present whereby a discrete particle growth can be adjusted. The particle size to be achieved in the discharge is dependent on the nucleus balance in the fluidized bed system. This is determined essentially by the equilibrium of nucleation by abrasion or non-impinging spraying droplets, and the construction of granules. The particle size can be adjusted in a controlled manner by selecting the drying and spraying parameters and by the use of a chopper in the fluidized bed. The granules thus generated can be discharged continuously from the drying chamber in the desired particle size by a classifying unit (e.g. sifter and underflow weir).

Figure 1:
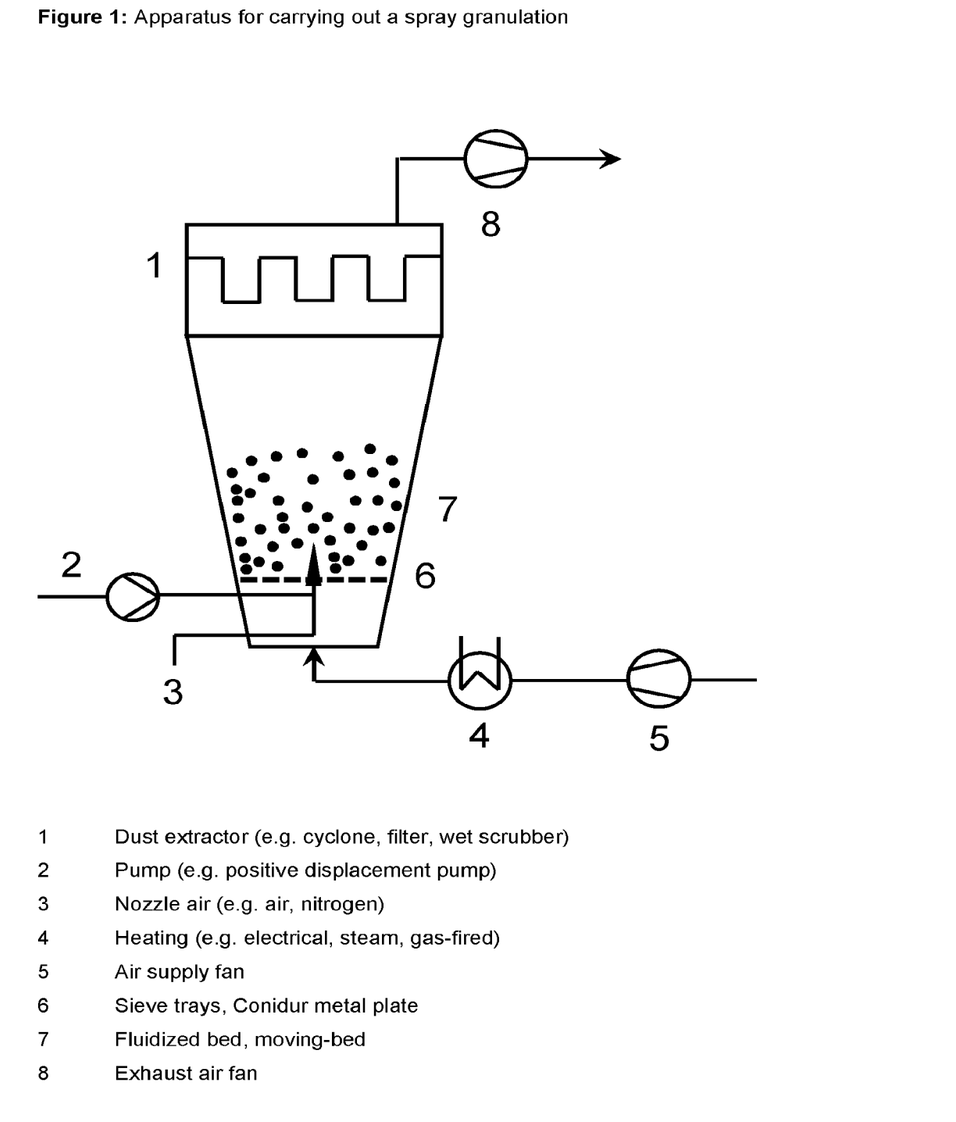
FIG. 1 illustrates an apparatus for carrying out a spray granulation.

The air required for drying and fluidizing is sucked in using a fan and is heated to the desired supply air temperature by an air heater (e.g. electrical, gas or steam heating). By means of the exhaust air fan, the pressure in the system is regulated. Owing to the diameter of the vortex chamber becoming larger, the speed of the gas decreases over the system height, whereby the discharge of fine particles from the system is reduced. Discharged particles are recycled into the system via a dust extractor (e.g. 6 cartridge filters) by releasing these from the filter elements pneumatically with compressed air. As an alternative to a filter separator, a cyclone or a cyclone/filter combination and wet scrubber may also be used.

The dried residue of the solution (ii) previously mentioned or the mother liquor from the hydantoin hydrolysis circulation described above served as carrier material (starting fill), which had been previously comminuted using a screen mill (e.g. mesh size=150 μm). As an alternative, methionine powder (particle size d50=180 μm) or Ekoperl—an oil binder composed of porous volcanic silicate rock (Perlite) with grain size 0.125 to 2 mm—can be used as starting material.

The suspension to be sprayed was a mixture of the evaporated solution (ii) mentioned above or the mother liquor of the hydantoin hydrolysis circulation mentioned at the outset (ca. 40% by weight dry mass) and an ammonium sulphate solution (solution (i) with a dry mass of ca. 30 to 40% by weight), which had been homogenized with the aid of a stirrer.

For the examples, several spray granulation experiments were carried out using various mixing ratios (solution (ii): solution (i) of 1:2, 1:1; 1:0.8 and 1:0.6) in the apparatus described above.

Aqueous solution (i): 35% by weight ammonium sulphate
Aqueous solution (ii) 4.6% by weight methionine,
 6.3% by weight methionylmethionine,
 9.7% by weight potassium In order to avoid addition to the spray nozzle of coarse solid particles, the solution or suspension used was dispersed using a high-performance dispersing device (e.g. ULTRA-TURRAX®) at ca. 10 000 rpm for 5 min. Subsequently, the solution/suspension was evaporated in an evaporator (e.g. laboratory rotary evaporator) from a solids content of ca. 30 to 40% by weight to a concentration of 60 to 70% by weight.

The examples were carried out in the apparatus described above according to FIG. 1 in continuous mode. Here, the following experimental parameters were set.

Parameters Set in the Fluidized Bed Spray Granulation:
T air supply=100-200° C.
T fluidized bed=60-110° C.
T exhaust air=60-130° C.
Spray rate=0.3-3 kg/h
Nozzle pressure (two-phase nozzle)=1.2 bar
Drying air volume flow=40-200 m³/h. This corresponds to a flow velocity of 0.6-3.1 m/s at the stated inflow area (0.018 m²)
System pressure above the sieve tray=10 mbar below atmospheric pressure
Mean residence time: 0.5-1 h
Continuous operation with discharge via a zigzag sifter
Parameters Set in the Coating of the Particles:
Two-phase nozzle,
Nozzle pressure: 1.2 bar
Spray rate: 0.3-3 kg/h
P=10 mbar below atmospheric pressure
T air supply=100-200° C.
T bed=60-110° C.
Mean residence time: 0.5-1 h
Batch operation

TABLE 1

Overview of granulation experiments

| Example No. | Mixing ratio solution (ii)/solution (i) | Binder | Coating [% by wt.] based on the total solids content of the particles |
|---|---|---|---|
| 1 | 1:1 | — | 10% by weight ammonium sulphate |
| 2 | 1:0.8 | — | uncoated |
| 3 | 1:0.6 | — | uncoated |
| 4 | 1:0.6 | volcanic rock, Perlite (ca. 30% by weight) | uncoated |
| 5*) | 1:2 | — | uncoated |
| 6 | 1:0, only solution (ii) | — | uncoated |

*)in Example 5 the pH of the starting mixture (prepared from solutions (i) and (ii)) was adjusted to 6 using sulphuric acid.

Examples 1 to 5

The mixtures subjected to the conditions of spray granulation according to Examples 1 to 5 could be granulated to particulate compositions having particle diameters of 1-4 mm. The compositions showed in each case a low tendency to dust formation, good to very good flowability (demonstrated by laboratory shear testing; cf. Table 3) and also good product stability (demonstrated by laboratory storage tests; cf. Table 3). The granules had in each case an especially low clumping tendency, particularly if the pH of the starting mixture was lowered by means of sulphuric acid or if the particles generated were coated additionally with solution (i) (ammonium sulphate) (Example 1). The bulk density of the granules generated were from 700-800 kg/m³.

The product according to Example 1 was coated in the batch process. The concentration of the ammonium sulphate layer may be determined from a mass balance assuming that a uniform wetting of the granules is ensured and no losses occur on spraying. The amount of ammonium sulphate sprayed minus the water corresponds to the proportion by mass of the ammonium sulphate coating based on the total weight of the end product.

Example 6 (Comparative Example)

The solution (ii) subjected to the conditions of spray granulation did not granulate but formed a sticky mass.

Product Properties Identified (Cf. Table 2):

TABLE 2

Product properties of the granules obtained

| Experiment No. | BD [kg/l] | Diameter (mm) | Tendency to dust formation | Flowability | Clumping tendency | Composition [% by weight] (Met/Met-Met/K/(NH$_4$)$_2$SO$_4$) |
|---|---|---|---|---|---|---|
| 1 | 0.75 | 1-2 | slight | good | slight | 5.2/4.4/11.7/45.6 |
| 2 | 0.75 | 1-2 | slight | good | slight | 5.5/4.6/12.2/42.8 |
| 3 | 0.75 | 1-4 | slight | good | slight | 6.5/5.5/14.6/34.2 |
| 4 | 0.75 | 1-4 | high | moderate | slight | not investigated |

TABLE 2-continued

Product properties of the granules obtained

| Experiment No. | BD [kg/l] | Diameter (mm) | Tendency to dust formation | Flowability | Clumping tendency | Composition [% by weight] (Met/Met-Met/K/(NH$_4$)$_2$SO$_4$) |
|---|---|---|---|---|---|---|
| 5 | 0.75 | 1-4 | slight | very good | slight | 4.5/4.7/10.4/53.0 |
| 6 | n.a. | n.a. | n.a. | poor | high | not investigated |

BD: bulk density,
n.a.: not applicable

Storage Stability:

With the exception of the product according to Example 4, which contained a binder, the products according to Examples 1 to 3 and 5 were dust-free and remained solid and dry even after several months at normal ambient air. Only a certain caking and a moderate sensitivity to elevated air humidity were identified but these did not notably limit the practical use of the product. The caking is however sometimes even considerably lower in the granules produced with addition of sulphuric acid (Example 5) compared to the granules produced without addition of sulphuric acid (Examples 2 and 3). It is possible, therefore, to break up again the slight hardening by simple mechanical stress (e.g. tumbling, dropping of sacks).

Figure 2:
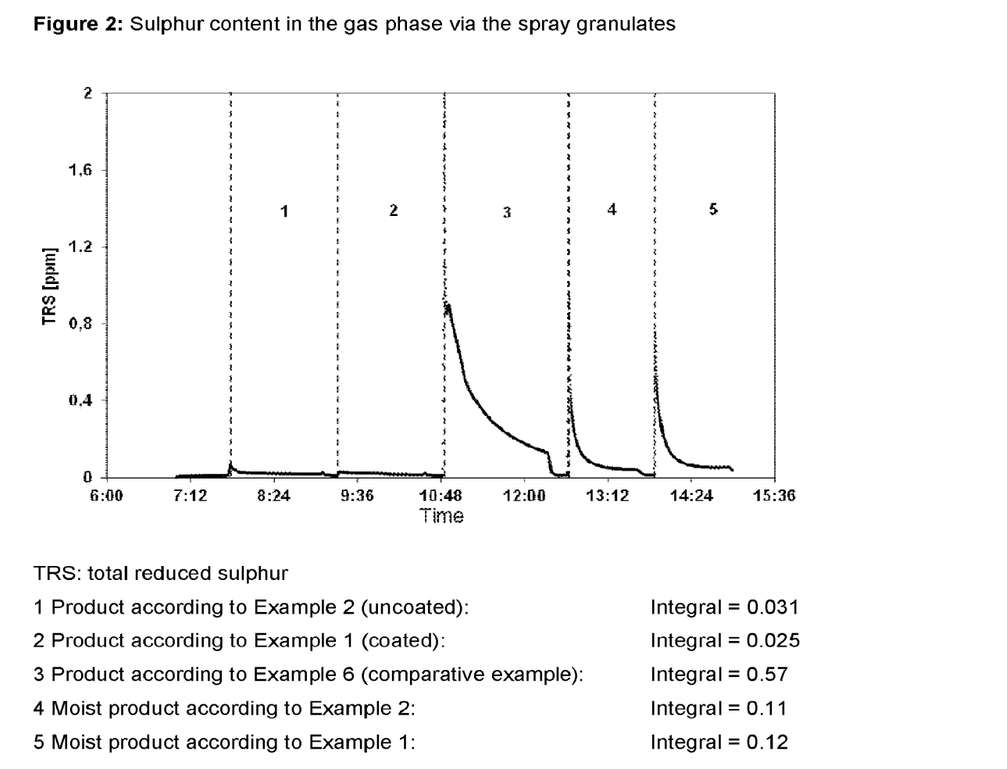
FIG. 2 shows sulphur content in the gas phase via the spray granulates.

Assessment of the Odour:

In order to make a statement regarding the release of unpleasant odours from the granulated product, the following laboratory tests were carried out:

For this purpose, the samples were placed in a U-tube and air was passed through them. In the exhaust air beyond the U-tube, the content of sulphur compounds, which are mainly responsible for the unpleasant odour, was determined by means of a UV fluorescence sulphur analyzer (e.g. manufacturer Horiba). The results are shown in FIG. 2. By means of the integral of the respective curve calculated over the same time interval, the concentration of the sulphur components released in the exhaust gas was assessed. The greater the integral, the more sulphur components were released.

In comparison to the sample from Example 6 (comparative Example), the content of sulphur compounds in the exhaust gas in the granulated product was about one power of ten lower. By irrigating the granules (e.g. by rain), the release of sulphur compounds is however increased, which was simulated by moistening the samples from Examples 1 and 2 (numbers 4 and 5 in FIG. 2).

Flow and Storage Characteristics of the Granules Produced (Cf. Table 3, FIG. 3)

To evaluate the storage stability, the granules were stored at defined climatic conditions (temperature and humidity) over a certain time period. Comparison of the flow properties before and after storage gives information about the storage stability of the product.

To measure the flow properties, so-called shear testers were used (according to ASTM Standards D6128 "Standard Shear Testing Method for Bulk solids using the Jenike Shear Cell"). The sample of flowable solid was filled into a shear cell for the measurement. The shear cell consisted of a base ring sealed below, an "upper ring" placed thereover of the same diameter and also a lid. The lid was subjected to a central load corresponding to a 6 m silo for example. By means of moving the upper ring and the lid with respect to the base ring, the sample of flowable solid was subjected to a shear deformation. The force required for the movement was measured. From the normal force and the shear force, the normal stress (initial shear stress, flow location) and the shear stress σt were calculated by division by the cross-sectional area A of the shear cell. The sample of flowable solid filled into the shear cell in each case was sheared at various normal stresses which was adjusted by applying a particular normal force. The greatest principal stress at stationary flow σ1 (=consolidation stress) arose from the stress circle which affects the flow location and proceeds by the initial shear point. The yield strength (compressive strength) σc arose from the stress circle which affects the flow location and whose smallest principal stress is equal to zero. In contrast to the monoaxial compressive test, the yield strength was not obtained directly in the measurement with shear devices but via the indirect flow location. The bulk density ρb was obtained by dividing the mass of the flowable solid in the shear cell by the volume of the shear cell (source: Dietmar Schulze, Pulver und Schüttgüter—Fließeigenschaften und (Grundlagen) Handhabung [Powders and Flowable Solids—Flow Properties and Handling (Fundamentals), Springer-Verlag, 3rd edition, 2014).

TABLE 3

Flow and storage characteristics of the granules generated

| Flow properties Instantaneous flow characteristics | Flow location Initial shear stress Pa | Consolidation stress σ1 Pa | Compressive strength σc Pa | Bulk density ρb kg/m$^3$ | Product from Example |
|---|---|---|---|---|---|
| | 2900 | 7965 | 471 | 709 | Example 2 |
| | 2900 | 9767 | 734 | 738 | Example 5 |

| Caking at initial shear stress of 2900 Pa | Load kg | Storage conditions | Compressive strength σc | Bulk density ρb | Product from Example |
|---|---|---|---|---|---|
| Storage period 24 h | 7 | 20° C., 40% rh | 24912 | 729 | Example 2 |
| | 7 | 20° C., 40% rh | 4077 | 714 | Example 5 |
| Storage period 24 h | 7 | 50° C., 7 kg | 10413 | 694 | Example 2 |
| | 7 | 50° C., 7 kg | 3764 | 693 | Example 5 |
| | 6 | 50° C., 6 kg | 18763 | 741 | Example 2 |
| | 6 | 50° C., 6 kg | 3444 | 712 | Example 5 |
| Storage period 24 h | 7 | 40° C., 75% rh | 21493 | 753 | Example 2 |
| | 7 | 40° C., 75% rh | 16743 | 801 | Example 5 |

| — | h | Storage conditions | Pa | kg/m$^3$ | |
|---|---|---|---|---|---|
| Variation of storage period | 0 | 20° C., 40% rh | 471 | 709 | Example 2 |
| | 24 | 20° C., 40% rh | 8184 | 711 | Example 2 |
| | 72 | 20° C., 40% rh | 13303 | 723 | Example 2 |
| | 168 | 20° C., 40% rh | 47797 | 708 | Example 2 |

TABLE 3-continued

Flow and storage characteristics of the granules generated

Figure 3:
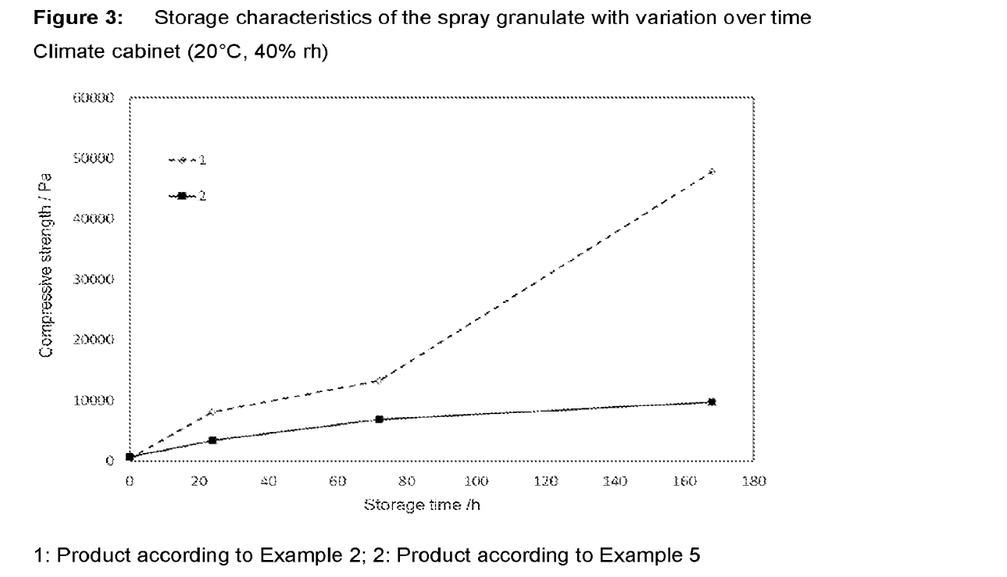
FIG. 3 shows storage characteristics of the spray granulates with variation over time in a climate cabinet (20° C., 40% rh).

| | | | | | |
|---|---|---|---|---|---|
| Variation of | 0 | 20° C., 40% rh | 734 | 738 | Example 5 |
| storage period | 24 | 20° C., 40% rh | 3444 | 712 | Example 5 |
| Load 6 kg | 72 | 20° C., 40% rh | 6929 | 722 | Example 5 |
| | 168 | 20° C., 40% rh | 9780 | 738 | Example 5 | rh = relative humidity
σ1 = maximum consolidation stress
σc = compressive strength (=breaking stress)
ρb = bulk density The compressive strength is in this case a measure of the yield strength or tendency to clumping. The higher the value of the compressive strength, the greater are the inner adhesion forces and greater is the clumping of the flowable solid. The results in Table 3 and in FIG. 3 show that the product additionally pH-adjusted with sulphuric acid prior to the spray granulation (Example 5) has even lower clumping also after weathering in the climate cabinet at 20° C. and 40% relative humidity for up to 168 h and also at extreme climate conditions (40% and 75% rh) has a better storage stability than granulate produced without prior adjustment of the pH to 3 to 6 with sulphuric acid (Example 2).

The invention claimed is:

1. A process for producing a particulate composition containing methionine, methionylmethionine, potassium salt and ammonium sulfate, the process comprising:
generating
particles from an aqueous mixture by a forming process with upstream and/or simultaneous evaporation of the water; and
drying the particles to obtain the particulate composition,
wherein the aqueous mixture comprises:
0.5 to 4% by weight of methionine,
0.5 to 5% by weight of methionylmethionine,
1 to 9% by weight of potassium in the form of a potassium salt; and
7 to 35% by weight of ammonium sulfate.

2. The process according to claim 1, wherein the aqueous mixture comprises:
1 to 3% by weight of the methionine,
1 to 4% by weight of the methionylmethionine,
2 to 7% by weight of the potassium in the form of the potassium salt, and/or
10 to 30% by weight of the ammonium sulfate.

3. The process according to claim 1, wherein the aqueous mixture is produced by mixing an aqueous solution (i) comprising 30 to 40% by weight of the ammonium sulfate with an aqueous solution (ii) comprising:
2 to 6% by weight of the methionine;
4 to 8% by weight of the methionylmethionine; and
6 to 14% by weight of the potassium in the form of the potassium salt,
such that a ratio of the aqueous solution (ii) to the aqueous solution (i) is from 1.0/0.5 to 1.0/3.0.

4. The process according to claim 3, wherein:
the aqueous solution (i) comprises 30 to 40% by weight of the ammonium sulfate; and
the aqueous solution (ii) comprises:
3 to 5% by weight of the methionine,
5 to 7% by weight of the methionylmethionine, and/or
8 to 12% by weight of the potassium in the form of the potassium salt.

5. The process according to claim 3, further comprising:
preparing the aqueous solution (i) comprising the ammonium sulfate primarily by treating a gaseous mixture comprising hydrogen cyanide and ammonia, generated in the production of hydrogen cyanide from methane and ammonia, with sulphuric acid and, subsequent, neutralizing a resulting aqueous solution with ammonia.

6. The process according to claim 3, further comprising:
preparing the aqueous solution (ii) by separating a mother liquor formed in the reaction of 5-(2-methylmercaptoethyl)hydantoin with potassium carbonate, potassium hydrogen carbonate and carbon dioxide to give the methionine.

7. The process according to claim 1, wherein the aqueous mixture is additionally treated with sulphuric acid until a pH of 3 to 6 is reached in the aqueous mixture, measured at room temperature with a glass pH electrode filled with liquid electrolyte in the form of a 3 molar KCl solution.

8. The process according to claim 1, wherein the aqueous mixture is also concentrated, prior to performing the forming process, by evaporation of water to give an aqueous suspension with a solids content of up to 70% by weight.

9. The process according to claim 1, wherein an ammonium sulfate shell layer is applied to the particles by spraying with an aqueous solution comprising 30 to 40% by weight ammonium sulfate with simultaneous evaporation of water, such that a proportion of the ammonium sulfate shell layer formed on the particles is 5 to 30% by weight based on the total solids content of the particles.

10. The process according to claim 1, wherein the potassium salt is present as at least one salt of an inorganic or organic acid.

11. The process according to claim 10, wherein the potassium salt is at least one potassium salt formed from an acid selected from the group consisting of formic acid, acetic acid, propanoic acid, 2-hydroxypropanoic acid, 2-hydroxy-4-methylthiobutanoic acid, $KHCO_3$, $K_2CO_3$, $KHSO_4$ and $K_2SO_4$.

12. The process according to claim 1, wherein the forming process is carried out as a spray granulation, mix granulation, extrusion or compaction.

13. The process according to claim 12, wherein the forming process is carried out as a spray granulation with a two-phase nozzle, in which a gas component together with the aqueous mixture is sprayed as a liquid component via the two-phase nozzle.

14. The process according to claim 13, wherein air or nitrogen are used as a gas component.

15. The process according to claim 13, wherein the forming process occurs in a fluidized bed at a temperature of 60 to 130° C.

16. A particulate composition, comprising:
5 to 10% by weight of methionine;
2.5 to 9% by weight of methionylmethionine;
4 to 20% by weight of potassium in the form of a potassium salt; and
27 to 80% by weight of ammonium sulfate.

17. The composition according to claim 16, comprising:
2 to 8% by weight of the methionine,
3 to 7% by weight of the methionylmethionine,
5 to 17% by weight of the potassium in the form of the potassium salt, and/or
30 to 76% by weight of the ammonium sulfate.

18. The composition according to claim 16, wherein the potassium salt is at least one potassium salt formed from an acid selected from the group consisting of formic acid, acetic acid, propanoic acid, 2-hydroxypropanoic acid, 2-hydroxy-4-methylthiobutanoic acid, $KHCO_3$, $K_2CO_3$, $KHSO_4$ and $K_2SO_4$.

19. The composition according to claim 16, further comprising:
   a binder selected from the group consisting of a porous volcanic silicate rock, a precipitated silica, a fumed silica, and a porous carbonate rock.

20. The composition according to claim 16, wherein:
   particles of the particulate composition have been coated with an ammonium sulfate layer; and
   a proportion of the ammonium sulfate layer is 5 to 30% by weight, based on the total solids content of the particles.

21. A fertilizer or fertilizer additives, comprising the particulate composition of claim 16.

* * * * *